US012711056B2

(12) United States Patent
Song et al.

(10) Patent No.: US 12,711,056 B2
(45) Date of Patent: Aug. 18, 2026

(54) INTERNAL MEMORY RECLAIMING METHOD AND APPARATUS, DEVICE, MEDIUM, AND PRODUCT

(71) Applicant: Tencent Technology (Shenzhen) Company Limited, Shenzhen (CN)

(72) Inventors: Kairui Song, Shenzhen (CN); Kaixu Xia, Shenzhen (CN); Jingxiang Zeng, Shenzhen (CN); Yushan Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 19/068,153

(22) Filed: Mar. 3, 2025

(65) Prior Publication Data

US 2025/0199950 A1 Jun. 19, 2025

Related U.S. Application Data

(63) Continuation of application No. PCT/CN2023/131408, filed on Nov. 14, 2023.

(30) Foreign Application Priority Data

Jan. 18, 2023 (CN) ........................ 202310089221.X

(51) Int. Cl.
*G06F 12/02* (2006.01)

(52) U.S. Cl.
CPC .................................. *G06F 12/023* (2013.01)

(58) Field of Classification Search
CPC ............... G06F 12/023; G06F 12/0246; G06F 12/0253; G06F 12/12; G06F 3/0644;
(Continued)

(56) References Cited

U.S. PATENT DOCUMENTS

| | | | | |
|---|---|---|---|---|
| 2019/0286341 | A1* | 9/2019 | Hou | G06F 3/0617 |
| 2022/0365823 | A1* | 11/2022 | Le Garjan | G06F 9/5016 |
| 2024/0302990 | A1* | 9/2024 | Zhou | G06F 16/221 |

FOREIGN PATENT DOCUMENTS

| | | |
|---|---|---|
| CN | 104881241 A | 9/2015 |
| CN | 109508301 A | 3/2019 |

(Continued)

OTHER PUBLICATIONS

International Search Report for PCT/CN2023/131408 dated Feb. 5, 2024.
Written Opinion for PCT/CN2023/131408 dated Feb. 5, 2024.

*Primary Examiner* — Jared I Rutz
*Assistant Examiner* — Edward Waddy, Jr.
(74) *Attorney, Agent, or Firm* — Sughrue Mion, PLLC

(57) ABSTRACT

An internal memory reclaiming method, performed by a computer system that includes at least two levels of SWAP devices, comprising: monitoring storage occupancy of the at least two levels of SWAP devices, wherein the at least two levels of SWAP devices comprise an upper-level SWAP device and a lower-level SWAP device; determining, when storage occupancy of the upper-level SWAP device reaches a water mark threshold, least recently used to-be-migrated data stored in the upper-level SWAP device; and migrating the to-be-migrated data from the upper-level SWAP device to the lower-level SWAP device.

19 Claims, 6 Drawing Sheets

(58) Field of Classification Search
CPC ........... G06F 3/0647; G06F 2212/7204; G06F 3/064; G06F 3/0679
USPC .......... 711/154, 103, 170, E12.001, E12.008
See application file for complete search history.

(56) References Cited

FOREIGN PATENT DOCUMENTS

| | | | |
|---|---|---|---|
| CN | 111522659 | A | 8/2020 |
| CN | 113590509 | A | 11/2021 |
| CN | 114036076 | A | 2/2022 |

* cited by examiner

Monitoring module
1210
Determining module
1220
Migrating module
1230
Updating module
1240

1300
Network
1312
1306
1308
Display
1309
Input device
Input/Output controller 1310
1301
Central processing unit
1311
Network interface unit
1305
System bus
1304
1302
Random access memory
Read-only memory
System memory
1303
1307
1313
Operating system
1314
Application
Mass storage device
1315
Another program module

INTERNAL MEMORY RECLAIMING METHOD AND APPARATUS, DEVICE, MEDIUM, AND PRODUCT

CROSS-REFERENCE TO RELATED APPLICATIONS

This application is a continuation application of International Application No. PCT/CN2023/131408 filed on Nov. 14, 2023 which claims priority to Chinese Patent Application No. 202310089221.X, filed with the China National Intellectual Property Administration on Jan. 18, 2023, the disclosures of each being incorporated by reference herein in their entireties.

FIELD

The disclosure relates to the field of internal memory reclaiming technologies, and in particular, to an internal memory reclaiming method and apparatus, a device, a storage medium, and a product.

BACKGROUND

In the related art, to enhance performance, a computer system may adopt an internal memory-intensive policy, utilizing as much internal memory as possible to improve cache performance. As a result, various processes remain in internal memory for extended durations. However, as the computer system's internal memory is gradually consumed, these processes may be unable to obtain additional internal memory, necessitating memory reclamation.

The internal memory pressure of the computer system may be reduced by swapping out part of internal memory reclaiming data in the computer system to a SWAP device. At least two levels of SWAP devices are supported in the computer system, and SWAP devices have different priorities, thereby having different orders of use. The usage rule of the SWAP device is to preferentially use a SWAP device with a first priority, and use a SWAP device with a second priority when the SWAP device with a first priority is used up. A SWAP device with a higher priority indicates a faster access speed.

However, because the internal memory reclaiming data that has not been used for a long time in the computer system may not be swapped in for a long time after being swapped out to the SWAP device with the first priority, the above method may cause a large quantity of internal memory reclaiming data that has not been used for a long time to be accumulated in the SWAP device with the first priority. As a result, the SWAP device with the first priority is unavailable, and internal memory reclaiming data that is used relatively frequently can only be swapped out to a secondary SWAP device. This affects a speed of the internal memory reclaiming data that is used relatively frequently during swapping in.

SUMMARY

Provided are an internal memory reclaiming method and apparatus, a device, a storage medium, and a product, which implement dynamic memory management across multiple levels of SWAP devices, effectively improving system memory utilization and performance.

According to some embodiments, an internal memory reclaiming method, performed by a computer system that includes at least two levels of SWAP devices, comprises monitoring storage occupancy of the at least two levels of SWAP devices, wherein the at least two levels of SWAP devices comprise an upper-level SWAP device and a lower-level SWAP device; determining, when the storage occupancy of the upper-level SWAP device reaches a water mark threshold, least recently used to-be-migrated data stored in the upper-level SWAP device; and migrating the to-be-migrated data from the upper-level SWAP device to the lower-level SWAP device.

According to some embodiments, an internal memory reclaiming apparatus comprises at least one memory configured to store program code; and at least one processor configured to read the program code and operate as instructed by the program code. The program code comprises monitoring code configured to cause at least one of the at least one processor to monitor storage occupancy of the at least two levels of SWAP devices, wherein the at least two levels of SWAP devices comprise an upper-level SWAP device and a lower-level SWAP device; determining code configured to cause at least one of the at least one processor to determine, when the storage occupancy of the upper-level SWAP device reaches a water mark threshold, least recently used to-be-migrated data stored in the upper-level SWAP device; and migrating code configured to cause at least one of the at least one processor to migrate the to-be-migrated data from the upper-level SWAP device to the lower-level SWAP device.

According to some embodiments, a non-transitory computer-readable storage medium may store computer code which, when executed by at least one processor, causes the at least one processor to perform the internal memory reclaiming method. The method includes monitoring storage occupancy of the at least two levels of SWAP devices, determining, when the storage occupancy of the upper-level SWAP device reaches a water mark threshold, least recently used to-be-migrated data stored in the upper-level SWAP device, and migrating the to-be-migrated data from the upper-level SWAP device to the lower-level SWAP device.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figures 1, 2:
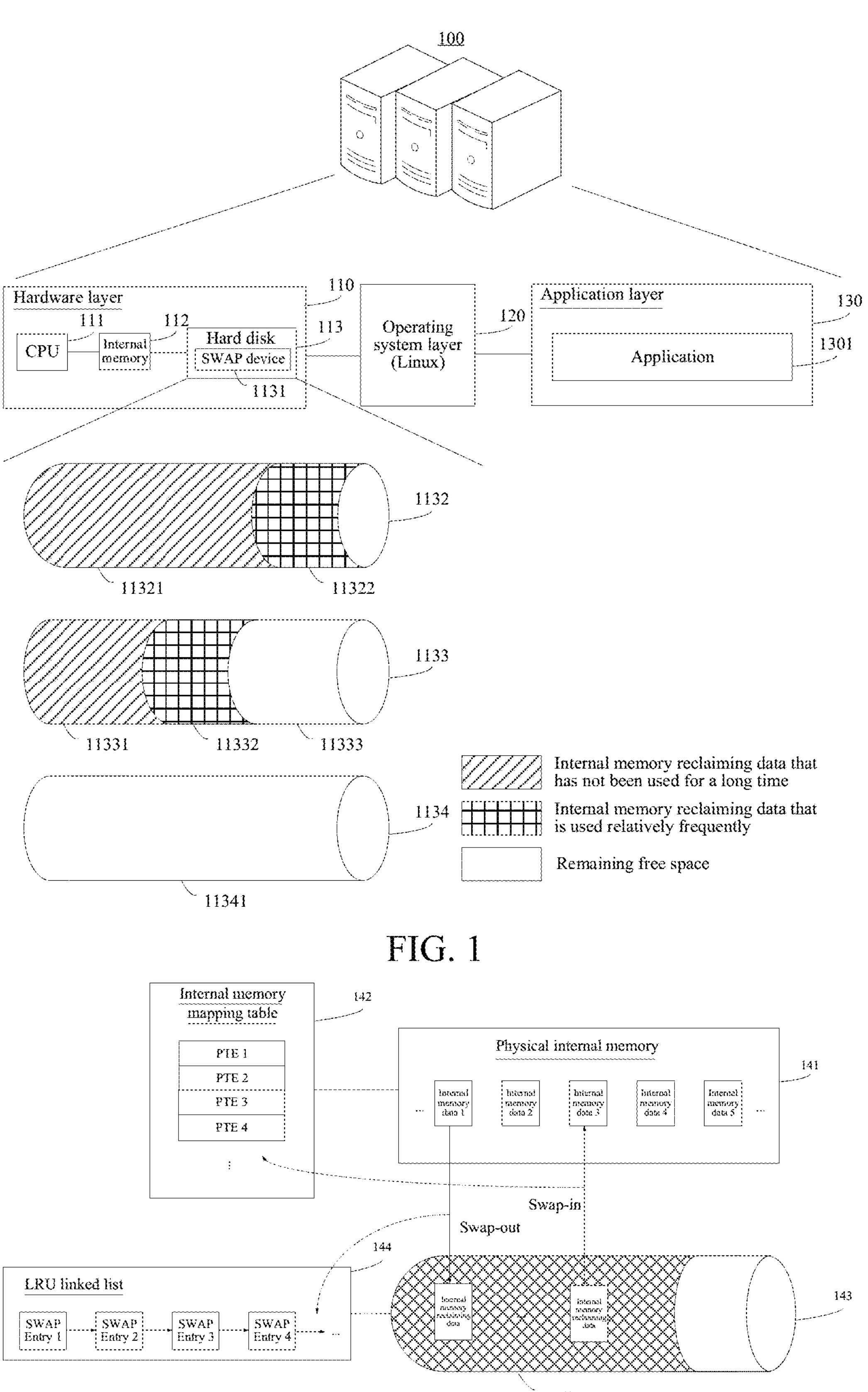
FIG. 1 is a block diagram of a structure of a computer system according to some embodiments.
FIG. 2 is a block diagram of a structure of an internal memory reclaiming method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

First, terms involved in some embodiments of this application are briefly introduced.

SWAP: Refers to a case in which when physical internal memory of a computer system is insufficient, part of storage space in the physical internal memory is released and temporarily stored in preset storage space.

SWAP device: Refers to temporary storage space of internal memory data in the computer system, and is configured to swap internal memory data out from the physical internal memory, to obtain more free physical internal memory. When the physical internal memory of the computer system is insufficient, part of the internal memory data in the physical internal memory is swapped out to the SWAP device.

A plurality of levels of SWAP devices: Refer to SWAP devices with different priorities in use in the computer system. In general, when swapping out the internal memory data, the computer system may preferentially use a SWAP device with a high priority, and use a SWAP device with a low priority only when the SWAP device with a high priority is used up. A SWAP device with a higher priority indicates a faster access speed.

Least recently used (LRU): Refers to an algorithm in the computer system. By maintaining an LRU linked list, the computer system may quickly find out a piece of internal memory data that has not been used for the longest time recently. The computer system places recently used internal memory data in a header of the LRU linked list; and when internal memory data in the cache is accessed, the internal memory data is moved to the header of the LRU linked list, that is, internal memory data at the end of the LRU linked list is least recently used internal memory data. A detailed introduction of the LRU algorithm can be found at the introduction of the website: https://blog.csdn.net/belongtocode/article/details/102989685.

SWAP entry: Refers to an item that is in the SWAP device and that is used for storing or recording a physical address of corresponding internal memory reclaiming data, including an identifier of a SWAP device in which internal memory reclaiming data is located, an offset of the internal memory reclaiming data in the SWAP device, and other information.

FIG. 1 is a block diagram of a structure of a computer system 100 according to some embodiments. The compute system 100 includes one server or a cluster of several servers.

The server includes a hardware layer 110, an operating system layer 120, and an application layer 130.

The hardware layer 110 includes at least one of a power supply, a central processing unit (CPU), a memory, a hard disk, a network device, an input/output device (I/O device), a fan, and an optical drive. As shown in FIG. 1, that the hardware layer 110 includes a CPU 111, a memory 112, and a hard disk 113 is used as an example. The hardware layer 110 is also provided with virtual internal memory space for temporarily storing internal memory reclaiming data of the computer system 100, and the virtual internal memory is also referred to as a SWAP device 1131. The SWAP device 1131 may be configured to: release part of internal memory space in physical internal memory when the physical internal memory in the computer system 100 is insufficient, and save internal memory reclaiming data in the released part of the internal memory space to the SWAP device 1131. In some embodiments, descriptions are provided in an example in which the SWAP device is a hard disk. A person skilled in the art is to know that the SWAP device may be a reserved internal memory area in the computer system.

The computer system may include a plurality of SWAP devices, and the SWAP devices may have different priorities. Generally, a SWAP device with a high priority may be used preferentially, and a SWAP device with a low priority is used only when the SWAP device with a high priority is used up. For example, the computer system 100 shown in FIG. 1 includes a SWAP device 1132, a SWAP device 1133, and a SWAP device 1134. A priority of the SWAP device 1132 is higher than that of the SWAP device 1133, and the priority of the SWAP device 1133 is higher than that of the SWAP device 1134. The computer system 100 preferentially uses the SWAP device 1132 to swap out internal memory reclaiming data in internal memory space. As shown in FIG. 1, the SWAP device 1132 includes internal memory reclaiming data 11321 that has not been used for a long time and internal memory reclaiming data 11322 that is used relatively frequently, and free space in the SWAP device 1132 is fully used by the internal memory reclaiming data 11321 that has not been used for a long time and the internal memory reclaiming data 11322 that is used relatively frequently. Therefore, the computer system 100 continues to use the SWAP device 1133 to swap out the internal memory reclaiming data in the internal memory space. As shown in FIG. 1, the SWAP device 1133 includes internal memory reclaiming data 11331 that has not been used for a long time, internal memory reclaiming data 11332 that is used relatively frequently, and remaining free space 11333. When free space in the SWAP device 1133 has not been fully used, the computer system 100 does not continue to use the SWAP device 1134, and therefore, the SWAP device 1134 includes only free space 11341. In some embodiments, three levels of SWAP devices: an internal memory optimization (ZRAM)

device, a non-volatile memory express (NVME) device, and a hard disk drive (HDD) are used as an example. ZRAM has the highest priority and the fastest access speed. A priority of NVME is lower than that of ZRAM, and an access speed of NVME is slower than that of ZRAM. SDD/HDD/Hybrid has the lowest priority, which is lower than that of NVME. An access speed of SDD/HDD/Hybrid is the slowest, which is slower than that of NVME. When the internal memory reclaiming method proposed in this application is not used, relying on an original SWAP device balance mechanism in the computer system may soon lead to accumulation of a large quantity of internal memory reclaiming data that is not used for a long time in the SWAP device with the highest priority.

The operating system layer 120 may be used for realizing allocation of a plurality of resources and management of a plurality of processes in the computer system 100. In some embodiments, a Linux operating system is used as an example.

The application layer 130 includes one or more applications running in the computer system 100. As shown in FIG. 1, an application 1301 is included. Each application includes one or more processes. A person skilled in the art is to know that a quantity of the applications may be more or less, for example, the quantity of the applications may be only one, or may be dozens or hundreds, or more. A quantity of applications is not limited in some embodiments.

FIG. 2 is a diagram of a structure of an internal memory reclaiming method according to some embodiments of this application. The method includes physical internal memory 141 and a SWAP device 143 in a computer system.

The physical internal memory 141 includes at least one piece of or a group of internal memory data, for example, as shown in FIG. 2, including internal memory data 1, internal memory data 2, internal memory data 3, internal memory data 4, and internal memory data 5. A person skilled in the art is to know that a quantity of the internal memory data may be more or less, for example, the quantity of the internal memory data may be only one, may be dozens or hundreds, or more. A quantity of internal memory data is not limited in some embodiments. In the computer system, the physical internal memory 141 corresponds to an internal memory mapping table 142, the internal memory mapping table 142 includes a page table entry (PTE) corresponding to internal memory data, and the PTE is used for storing or recording a location of corresponding internal memory data in the computer system. For example, PTE 1 corresponds to the internal memory data 1, PTE 2 corresponds to the internal memory data 2, and PTE 3 corresponds to the internal memory data 3.

The physical internal memory 141 realizes internal memory reclaiming by swapping out internal memory data in the physical internal memory 141 to the SWAP device 143. The SWAP device 143 includes internal memory reclaiming data 1421 that is obtained through reclaiming. Each SWAP device maintains an LRU linked list, and the LRU linked list is used for maintaining an order in which different pieces of internal memory reclaiming data 1421 are reclaimed to the SWAP device. Generally, the order is from least recently used internal memory reclaiming data to most recently used internal memory reclaiming data sequentially. For example, as shown in FIG. 2, the SWAP device 143 maintains an LRU linked list 144, and a SWAP entry is stored or recorded in the LRU linked list. For example, SWAP entry 1, SWAP entry 2, SWAP entry 3, and SWAP entry 4 are recorded in the LRU linked list 144, and SWAP entry 1, SWAP entry 2, SWAP entry 3, and SWAP entry 4 are listed in order in the LRU linked list 144. The SWAP entry is used for recording storage location information of the internal memory reclaiming data 1421. The storage location information includes an identifier of a SWAP device in which the internal memory reclaiming data 1421 is located, an offset of the internal memory reclaiming data in the SWAP device, and other information.

When the internal memory reclaiming data is swapped out from the physical internal memory 141 to the SWAP device 143, the computer system correspondingly allocates a SWAP entry and inserts the SWAP entry into the LRU linked list 144. When the internal memory reclaiming data is swapped into the physical internal memory 141 again from the SWAP device 143, the computer system rewrites a new PTE in the internal memory mapping table 142.

Figures 3, 4:
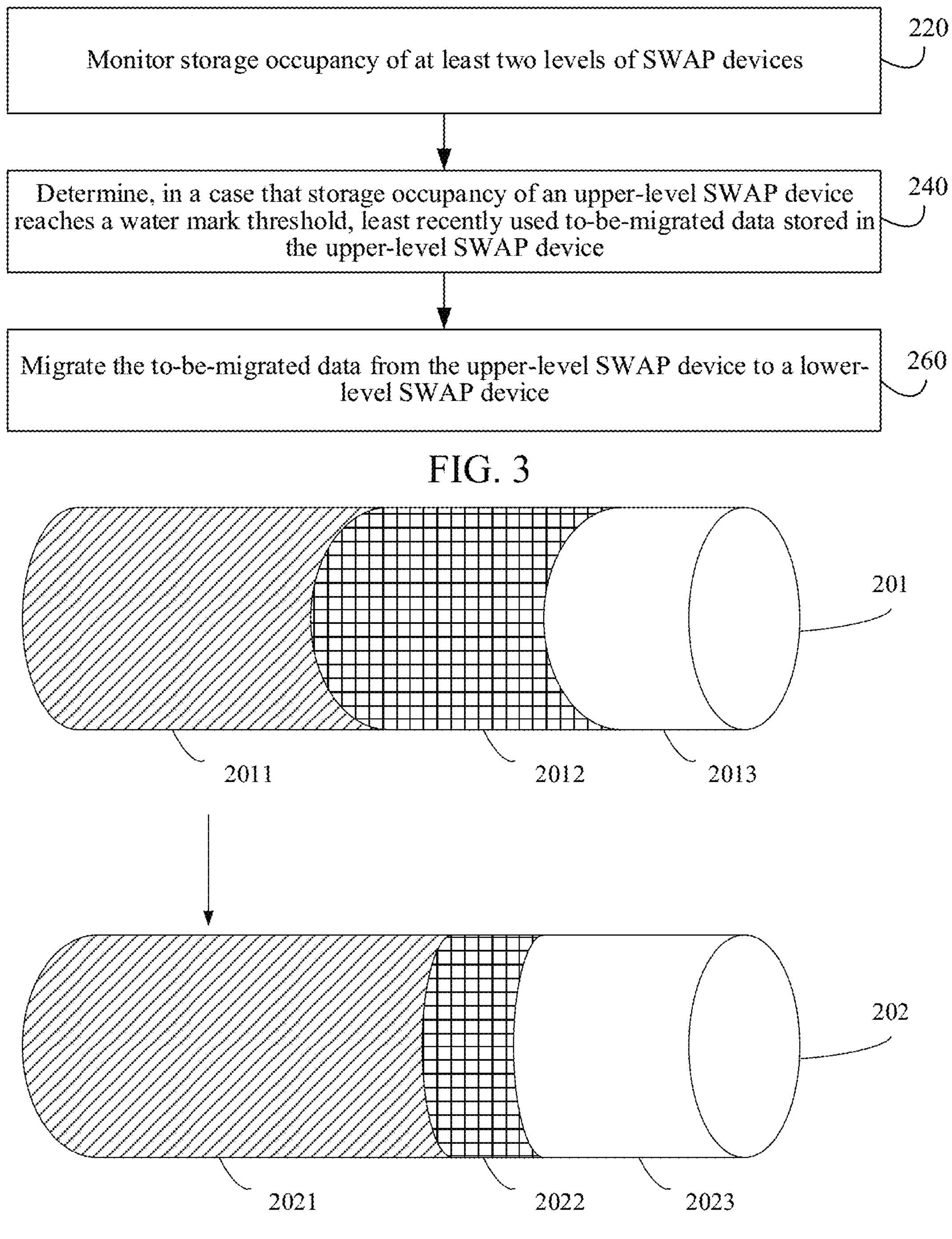
FIG. 3 is a flowchart of an internal memory reclaiming method according to some embodiments.
FIG. 4 is a schematic diagram of an internal memory reclaiming method according to some embodiments.

FIG. 3 is a flowchart of an internal memory reclaiming method according to some embodiments. The method is performed by a computer system, the computer system includes at least two levels of SWAP devices, and the method includes the following operations.

Operation 220: Monitor storage occupancy of at least two levels of SWAP devices.

Monitor storage occupancy of at least two levels of SWAP devices in the computer system. The at least two levels of SWAP devices include an upper-level SWAP device and a lower-level SWAP device based on different priorities, and a priority of the upper-level SWAP device is higher than that of the lower-level SWAP device. Therefore, when the computer system swaps out internal memory reclaiming data in physical internal memory, the internal memory reclaiming data is preferentially swapped out to the upper-level SWAP device.

Storage occupancy of any level of SWAP device is counted separately. The storage occupancy refers to usage of free space in a SWAP device, and the usage is used for reflecting internal memory reclaiming data already stored in the SWAP device. For example, as shown in FIG. 4, an example in which the computer system includes an upper-level SWAP device 201 and a lower-level SWAP device 202 is used for description. The upper-level SWAP device 201 includes internal memory reclaiming data 2011 that has not been used for a long time, internal memory reclaiming data 2012 that is used relatively frequently, and remaining free space 2013. Consequently, storage occupancy of the upper-level SWAP device 201 is a sum of the internal memory reclaiming data 2011 that has not been used for a long time and the internal memory reclaiming data 2012 that is used relatively frequently. The lower-level SWAP device 202 includes internal memory reclaiming data 2021 that has not been used for a long time, internal memory reclaiming data 2022 that is used relatively frequently, and remaining free space 2023. Consequently, storage occupancy of the lower-level SWAP device 202 is a sum of the internal memory reclaiming data 2021 that has not been used for a long time and the internal memory reclaiming data 2022 that is used relatively frequently.

Operation 240: Determine, in a case that the storage occupancy of the upper-level SWAP device reaches a water mark threshold, least recently used to-be-migrated data stored in the upper-level SWAP device.

Determine, in a case that the storage occupancy of the upper-level SWAP device reaches a water mark threshold, least recently used to-be-migrated data stored in the upper-level SWAP device.

The water mark threshold refers to a usage threshold of the free space in the upper-level SWAP device, and the usage threshold is used for indicating that the remaining free space in the upper-level SWAP device is insufficient. When the storage occupancy of the upper-level SWAP device is less than or equal to the water mark threshold, it reflects that the remaining free space in the upper-level SWAP device is sufficient, and internal memory reclaiming data may be continuously swapped out to the upper-level SWAP device; and when the storage occupancy of the upper-level SWAP device is greater than the water mark threshold, it reflects that the remaining free space in the upper-level SWAP device is insufficient, and there is a possibility that internal memory reclaiming data cannot be continuously swapped out to the upper-level SWAP device.

In some embodiments, the water mark threshold may be preset in the computer system, or may be adjusted in real time based on a running state of the computer system. For example, the water mark threshold may be set to 60% or 80% of the maximum storage space of the upper-level SWAP device, and for example, may be adjusted based on a global pressure stall information (PSI) value of the computer system. When the global PSI value is small, it indicates that a delay of resource scheduling of the computer system is small in this case, and the water mark threshold is lowered to reclaim more internal memory in time. When the global PSI value is large, it indicates that the delay of resource scheduling of the computer system is large in this case, and the water mark threshold is raised to avoid affecting normal operation of the computer system.

In some embodiments, a mapping comparison table between the global PSI value and the water mark threshold is obtained; and the water mark threshold is adjusted based on a correspondence between the global PSI value and the water mark threshold in the mapping comparison table.

For example, with the decrease of the global PSI value, the water mark threshold is lowered; and with the increase of the global PSI value, the water mark threshold is raised.

The least recently used to-be-migrated data refers to internal memory reclaiming data that is stored in the upper-level SWAP device and that has not been used for a long time, and the least recently used to-be-migrated data can be quickly found through the LRU linked list maintained in the upper-level SWAP device. For example, as shown in FIG. 4, in a case that the storage occupancy of the upper-level SWAP device 201 reaches the water mark threshold, it is determined that the internal memory reclaiming data 2011 that has not been used for a long time and that is in the upper-level SWAP device 201 is the least recently used to-be-migrated data.

Operation 260: Migrate the to-be-migrated data from the upper-level SWAP device to the lower-level SWAP device.

Migrate the determined least recently used to-be-migrated data stored in the upper-level SWAP device from the upper-level SWAP device to the lower-level SWAP device. For example, as shown in FIG. 4, it is determined that the least recently used to-be-migrated data stored in the upper-level SWAP device 201 is the internal memory reclaiming data 2011 that has not been used for a long time, and the internal memory reclaiming data is migrated from the upper-level SWAP device 201 to the lower-level SWAP device 202, to release storage space in the upper-level SWAP device 201.

In some embodiments, in a case that there is only one lower-level SWAP device, and a size of space that the to-be-migrated data needs to occupy is less than or equal to a space size of a target storage location, the to-be-migrated data is migrated from the upper-level SWAP device to a target storage location in the lower-level SWAP device.

In some embodiments, in a case that there is only one lower-level SWAP device, and a size of space that the to-be-migrated data needs to occupy is greater than a space size of a target storage location, part of the to-be-migrated data is migrated from the upper-level SWAP device to a target storage location in the lower-level SWAP device.

A size of space that the part of the to-be-migrated data occupy is a space size of the target storage location in the lower-level SWAP device. That is, in a case that the target storage location is insufficient to place the to-be-migrated data, only part of the to-be-migrated data is placed.

For example, 520 M of data may be placed in a target storage location in the lower-level SWAP device, and a data size of the to-be-migrated data is 888 M, so the target storage location is insufficient to place all of the to-be-migrated data. As a result, part of the to-be-migrated data, that is, only 520 M of to-be-migrated data, is placed in the lower-level SWAP device.

In some embodiments, a manner for determining the part of the to-be-migrated data includes but is not limited to at least one of the following manners: randomly selecting data from the to-be-migrated data; performing selection based on a storage time of each data in the to-be-migrated data; for example, the storage time of each data in the to-be-migrated data is arranged in descending order, and part of to-be-migrated data is selected based on the storage time; and performing selection based on a data occupying space size of each data in the to-be-migrated data; for example, the data occupying space size of each data in the to-be-migrated data is arranged in descending order, and part of the to-be-migrated data is selected based on the data occupying space size.

In some embodiments, in a case that there are a plurality of lower-level SWAP devices, a lower-level SWAP device for placing to-be-migrated data is selected based on priorities of the plurality of lower-level SWAP devices; and the to-be-migrated data is migrated from the upper-level SWAP device to the target storage location in the lower-level SWAP device.

In some embodiments, when there are a plurality of lower-level SWAP devices, a lower-level SWAP device for placing to-be-migrated data is selected based on priorities of the plurality of lower-level SWAP devices; and in a case that the size of the space that the to-be-migrated data needs to occupy is greater than the space size of the target storage location, the priorities of the plurality of lower-level SWAP devices are rearranged, a lower-level SWAP device that is with a higher original priority and that is with a space size of a target storage location greater than the size of the space that the to-be-migrated data needs to occupy is selected from the plurality of updated lower-level SWAP devices as the lower-level SWAP device for storing the to-be-migrated data, and the to-be-migrated data is migrated from the upper-level SWAP device to the target storage location in the lower-level SWAP device.

In conclusion, according to some embodiments, the storage occupancy of at least two levels of SWAP devices is monitored, and in a case that the storage occupancy of the upper-level SWAP device reaches a water mark threshold, least recently used to-be-migrated data stored in the upper-level SWAP device is migrated to the lower-level SWAP device, to swap out the least recently used to-be-migrated data accumulated in the upper-level SWAP device to the lower-level SWAP device, thereby releasing the storage space in the upper-level SWAP device and avoiding performance degradation of the computer system due to unbalanced use of the plurality of levels of SWAP devices.

Figures 5, 6:
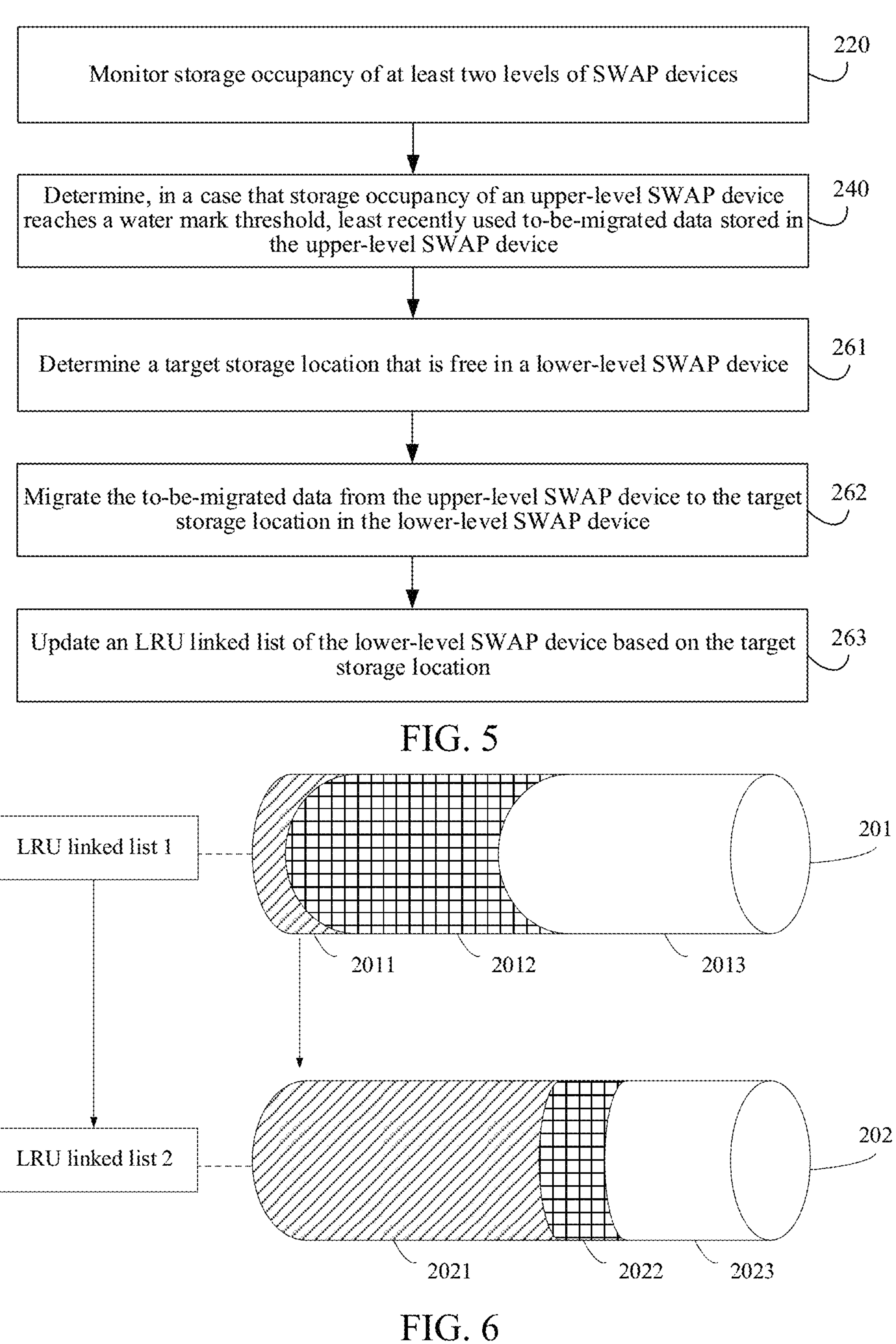
FIG. 5 is a flowchart of an internal memory reclaiming method according to some embodiments.
FIG. 6 is a schematic diagram of an internal memory reclaiming method according to some embodiments.

FIG. 5 is a flowchart of an internal memory reclaiming method according to some embodiments of this application.

The method is performed by a computer device, and operation 260 further includes at least one of the following sub-operations.

Operation 261: Determine a target storage location that is free in the lower-level SWAP device.

A target storage location that is free is determined in the lower-level SWAP device. The target storage location refers to remaining free space in the lower-level SWAP device other than space storing internal memory reclaiming data that has not been used for a long time and internal memory reclaiming data that is used relatively frequently in physical internal memory, and the remaining free space may be used for continuously storing internal memory reclaiming data. For example, as shown in FIG. 4, remaining free space 2023 in a lower-level SWAP device 202 is the target storage location.

Operation 262: Migrate the to-be-migrated data from the upper-level SWAP device to the target storage location in the lower-level SWAP device.

Migrate the determined least recently used to-be-migrated data stored in the upper-level SWAP device from the upper-level SWAP device to the target storage location in the lower-level SWAP device. For example, as shown in FIG. 6, it is determined that the least recently used to-be-migrated data stored in the upper-level SWAP device 201 is the internal memory reclaiming data 2011 that has not been used for a long time, and the internal memory reclaiming data is migrated from the upper-level SWAP device 201 to the remaining free space 2023 in the lower-level SWAP device 202, to release storage space in the upper-level SWAP device 201.

Operation 263: Update an LRU linked list of the lower-level SWAP device based on the target storage location.

Update an LRU linked list of the lower-level SWAP device based on the target storage location that is free in the lower-level SWAP device. In some embodiments, any SWAP device includes an LRU linked list, and the LRU linked list is used for maintaining an order in which different pieces of internal memory reclaiming data are reclaimed to the SWAP device. Generally, the order is from least recently used internal memory reclaiming data to most recently used internal memory reclaiming data sequentially. When the internal memory reclaiming data is migrated from the upper-level SWAP device to the lower-level SWAP device, an LRU linked list corresponding to the upper-level SWAP device and an LRU linked list corresponding to the lower-level SWAP device need to be modified correspondingly, including removing a SWAP entry corresponding to to-be-migrated data in the LRU linked list of the upper-level SWAP device and inserting a SWAP entry corresponding to to-be-migrated data in the LRU linked list of the lower-level SWAP device. For example, as shown in FIG. 6, the upper-level SWAP device 201 corresponds to LRU linked list 1, and the lower-level SWAP device 202 corresponds to LRU linked list 2. LRU linked list 2 of the lower-level SWAP device 202 is updated based on the target storage location in the lower-level SWAP device 202, and a SWAP entry corresponding to the target storage location is inserted into LRU linked list 2 of the lower-level SWAP device 202.

In conclusion, according to some embodiments, the to-be-migrated data is migrated from the upper-level SWAP device to the target storage location in the lower-level SWAP device, and the LRU linked list of the lower-level SWAP device is updated, to swap out the least recently used to-be-migrated data accumulated in the upper-level SWAP device to the lower-level SWAP device, thereby releasing the storage space in the upper-level SWAP device. In addition, the LRU linked list corresponding to the lower-level SWAP device is updated to avoid a case in which the computer system cannot accurately determine a storage location of internal memory reclaiming data due to not updating in time.

Figures 7, 8:
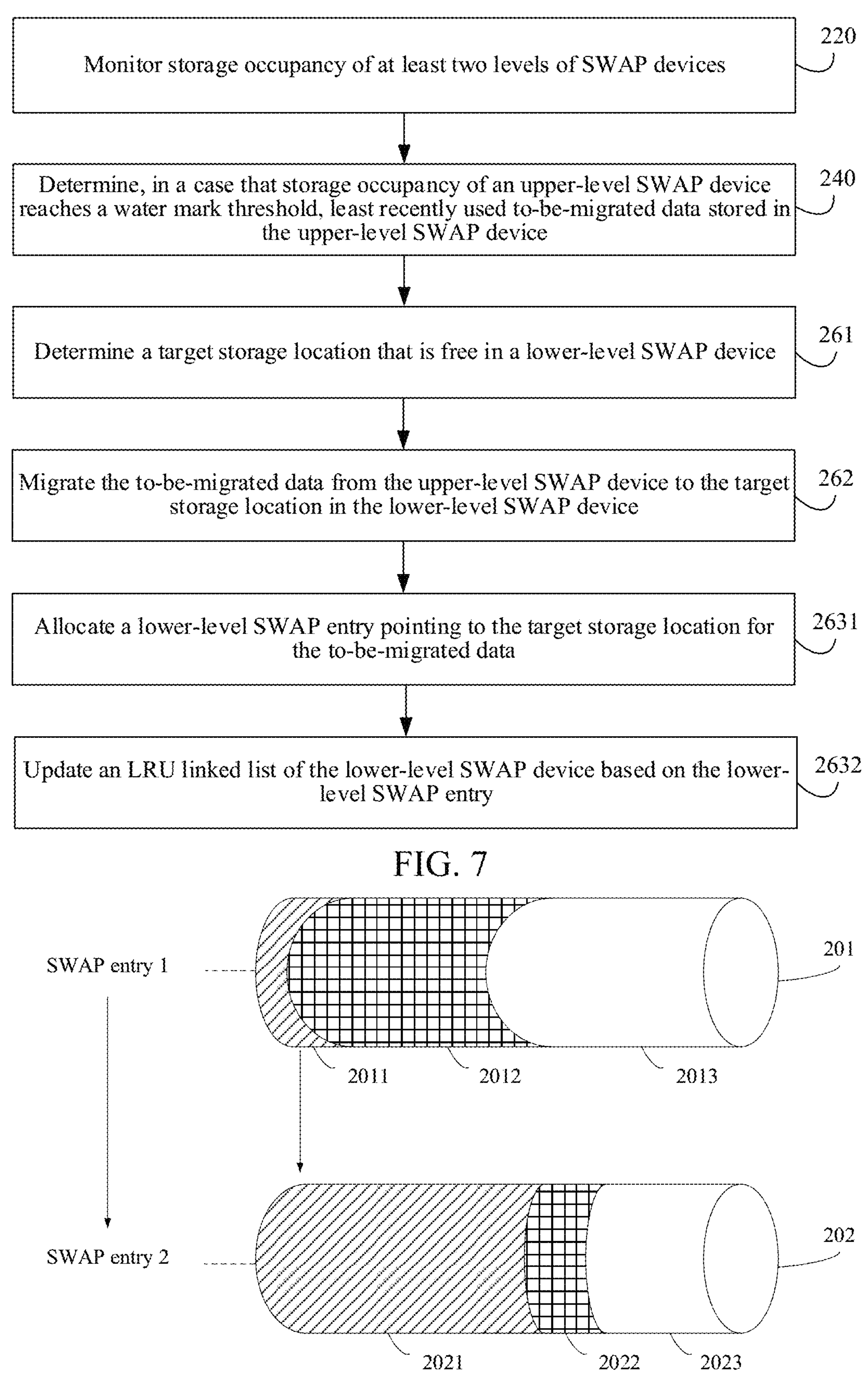
FIG. 7 is a flowchart of an internal memory reclaiming method according to some embodiments.
FIG. 8 is a schematic diagram of an internal memory reclaiming method according to some embodiments.

FIG. 7 is a flowchart of an internal memory reclaiming method according to some embodiments, and the method is performed by a computer system. Operation 263 further includes at least one of the following sub-operations.

Operation 2631: Allocate a lower-level SWAP entry pointing to the target storage location for the to-be-migrated data.

Allocate a lower-level SWAP entry pointing to the target storage location for the determined least recently used to-be-migrated data stored in the upper-level SWAP device.

The SWAP entry is used for recording storage location information of the internal memory reclaiming data. The storage location information includes an identifier of a SWAP device in which the internal memory reclaiming data is located, an offset of the internal memory reclaiming data in the SWAP device, and other information. When the internal memory reclaiming data is swapped out to the SWAP device, the computer system correspondingly allocates a SWAP entry and writes the SWAP entry into a page table in which a PTE corresponding to the internal memory reclaiming data in physical internal memory is located. For example, as shown in FIG. 8, internal memory reclaiming data in an upper-level SWAP device 201 corresponds to SWAP entry 1, and SWAP entry 1 includes an identifier of the upper-level SWAP device 201, an offset of the corresponding internal memory reclaiming data, and the like. Internal memory reclaiming data in a lower-level SWAP device 202 corresponds to SWAP entry 2, and SWAP entry 2 includes an identifier of the lower-level SWAP device 202, an offset of the corresponding internal memory reclaiming data, and the like.

When the to-be-migrated data is migrated from the upper-level SWAP device to the target storage location in the lower-level SWAP device, a lower-level SWAP entry pointing to the target storage location is allocated for the to-be-migrated data, for example, SWAP entry 2.

Operation 2632: Update the LRU linked list of the lower-level SWAP device based on the lower-level SWAP entry.

Update an LRU linked list of the lower-level SWAP device based on the lower-level SWAP entry pointing to the target storage location. In some embodiments, any SWAP device includes an LRU linked list, and the LRU linked list is used for maintaining an order in which different pieces of internal memory reclaiming data are reclaimed to the SWAP device. Generally, the order is from least recently used internal memory reclaiming data to most recently used internal memory reclaiming data sequentially, and the LRU linked list sequentially stores lower-level SWAP entries of different pieces of internal memory reclaiming data based on a storage time. For example, as shown in FIG. 8, LRU linked list 2 of the lower-level SWAP device is updated based on corresponding lower-level SWAP entry 2 in the lower-level SWAP device 202, and lower-level SWAP entry 2 is added to a corresponding location in LRU linked list 2.

In some embodiments, the upper-level SWAP device and the lower-level SWAP device separately correspond to an LRU linked list.

After the lower-level SWAP entry is determined, a manner for updating the LRU linked list of the lower-level SWAP device includes: the computer system inserts a lower-level SWAP entry corresponding to the to-be-migrated data into the LRU linked list of the lower-level SWAP device.

In some embodiments, the lower-level SWAP entry includes an identifier of the lower-level SWAP device, an offset of the to-be-migrated data in the lower-level SWAP device, and the like; and the computer system inserts the identifier of the lower-level SWAP device corresponding to the to-be-migrated data, the offset of the to-be-migrated data in the lower-level SWAP device, and the like into the LRU linked list of the lower-level SWAP device.

After the lower-level SWAP entry is determined, a manner for updating the LRU linked list of the upper-level SWAP device includes: the computer system removes an upper-level SWAP entry corresponding to to-be-migrated data in the LRU linked list of the upper-level SWAP device.

In some embodiments, the upper-level SWAP entry includes an identifier of the upper-level SWAP device, an offset of the to-be-migrated data in the upper-level SWAP device, and the like; and the computer system removes the identifier of the upper-level SWAP device corresponding to the to-be-migrated data in the LRU linked list of the upper-level SWAP device, the offset of the to-be-migrated data in the upper-level SWAP device, and the like.

In conclusion, according to some embodiments, the lower-level SWAP entry pointing to the target storage location is allocated for the to-be-migrated data, and the LRU linked list of the lower-level SWAP device is updated, to update the LRU linked list corresponding to the lower-level SWAP device based on the SWAP entry corresponding to the internal memory reclaiming data, and avoid a case in which the computer system cannot accurately determine a storage location of the internal memory reclaiming data due to not updating in time.

Figures 9, 10, 11:
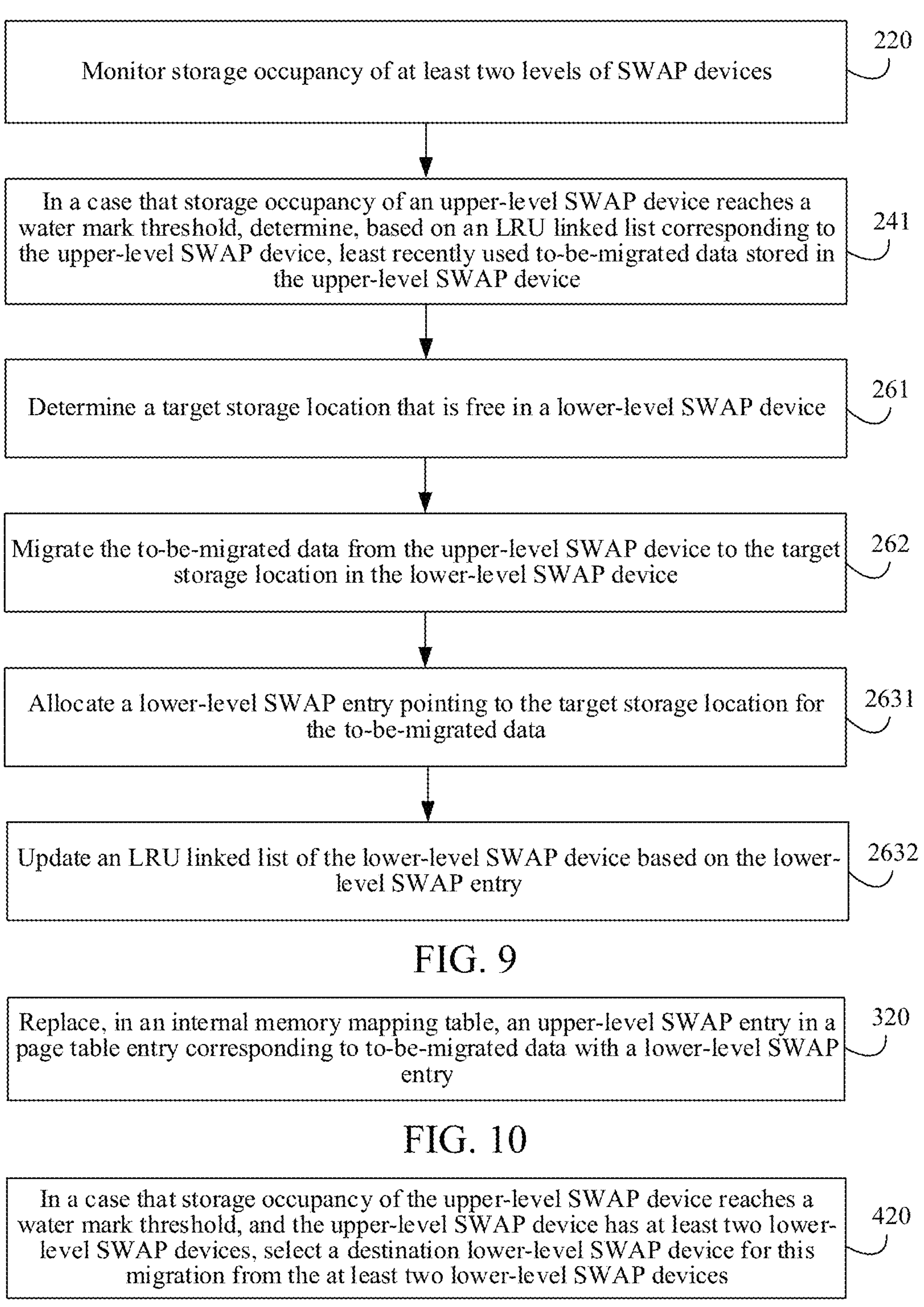
FIG. 9 is a flowchart of an internal memory reclaiming method according to some embodiments.
FIG. 10 is a flowchart of an internal memory reclaiming method according to some embodiments.
FIG. 11 is a flowchart of an internal memory reclaiming method according to some embodiments.

FIG. 9 is a flowchart of an internal memory reclaiming method according to some embodiments, and the method is performed by a computer system. Operation 240 may be replaced with operation 241.

Operation 241: In a case that the storage occupancy of the upper-level SWAP device reaches the water mark threshold, determine, based on an LRU linked list corresponding to the upper-level SWAP device, the least recently used to-be-migrated data stored in the upper-level SWAP device.

In a case that the storage occupancy of the upper-level SWAP device reaches the water mark threshold, determine, based on an LRU linked list corresponding to the upper-level SWAP device, the least recently used to-be-migrated data stored in the upper-level SWAP device. The water mark threshold refers to a usage threshold of the free space in the upper-level SWAP device, and the usage threshold is used for indicating that the remaining free space in the upper-level SWAP device is insufficient. When the storage occupancy of the upper-level SWAP device is less than or equal to the water mark threshold, it reflects that the remaining free space in the upper-level SWAP device is sufficient, and internal memory reclaiming data may be continuously swapped out to the upper-level SWAP device; and when the storage occupancy of the upper-level SWAP device is greater than the water mark threshold, it reflects that the remaining free space in the upper-level SWAP device is insufficient, and there is a possibility that internal memory reclaiming data cannot be continuously swapped out to the upper-level SWAP device. The water mark threshold may be preset in the computer system, or may be adjusted in real time based on a running state of the computer system. For example, the water mark threshold may be set to 60% or 80% of the maximum storage space of the upper-level SWAP device.

At least two levels of SWAP devices correspond to respective LRU linked lists. For example, as shown in FIG. 6, the upper-level SWAP device 201 corresponds to LRU linked list 1, and the lower-level SWAP device 202 corresponds to LRU linked list 2. The LRU linked list is used for maintaining an order in which different pieces of internal memory reclaiming data are reclaimed to the current SWAP device. Generally, the order is from least recently used internal memory reclaiming data to most recently used internal memory reclaiming data sequentially. When the internal memory reclaiming data is migrated from the upper-level SWAP device to the lower-level SWAP device, an LRU linked list corresponding to the upper-level SWAP device and an LRU linked list corresponding to the lower-level SWAP device need to be modified correspondingly, including removing a SWAP entry corresponding to to-be-migrated data in the LRU linked list of the upper-level SWAP device and inserting a SWAP entry corresponding to to-be-migrated data in the LRU linked list of the lower-level SWAP device. The least recently used to-be-migrated data refers to internal memory reclaiming data that is stored in the upper-level SWAP device and that has not been used for a long time, and the least recently used to-be-migrated data can be quickly found through the LRU linked list maintained in the upper-level SWAP device.

In conclusion, according to some embodiments, the least recently used to-be-migrated data stored in the upper-level SWAP device is determined based on the LRU linked list corresponding to the upper-level SWAP device, to swap out the least recently used to-be-migrated data accumulated in the upper-level SWAP device to the lower-level SWAP device, thereby releasing the storage space in the upper-level SWAP device and avoiding performance degradation of the computer system due to unbalanced use of the plurality of levels of SWAP devices.

FIG. 10 is a flowchart of an internal memory reclaiming method according to some embodiments. The method is performed by a computing device, and the method further includes the following operations.

Operation 320: Replace, in an internal memory mapping table, an upper-level SWAP entry in a page table entry corresponding to the to-be-migrated data with a lower-level SWAP entry.

In the computer system, physical internal memory corresponds to an internal memory mapping table, the internal memory mapping table includes a PTE corresponding to internal memory data, and the PTE is used for storing or recording a location of corresponding internal memory data in the physical internal memory. In a case that the corresponding internal memory data is swapped out from the physical internal memory to the SWAP device, the computer system reallocates a SWAP entry corresponding to internal memory reclaiming data that is obtained through reclaiming, and the SWAP entry is used for recording storage location information of the internal memory reclaiming data. The storage location information includes an identifier of a SWAP device in which the internal memory reclaiming data is located, an offset of the internal memory reclaiming data in the SWAP device, and other information. In this case, the computer system writes the SWAP entry into a location of a PTE corresponding to internal memory data before being swapped out from the physical internal memory. When the computer system accesses the SWAP entry, a page error may occur. By capturing information of the page error, the computer system swaps the internal memory data into the physical internal memory, and releases the SWAP entry on the SWAP device.

When least recently used to-be-migrated data stored in an upper-level SWAP device is migrated from the upper-level SWAP device to a target storage location in a lower-level SWAP device, an upper-level SWAP entry corresponding to the to-be-migrated data may be updated to a new corresponding lower-level SWAP entry, and in this case, a location corresponding to the to-be-migrated data changes. In an internal memory mapping table, an upper-level SWAP entry in a page table entry corresponding to the to-be-migrated data is also replaced with a lower-level SWAP entry.

In conclusion, according to some embodiments, the upper-level SWAP entry in the page table entry corresponding to the to-be-migrated data is replaced with the lower-level SWAP entry in the internal memory mapping table, to replace the upper-level SWAP entry in the internal memory mapping table with the lower-level SWAP entry based on the SWAP entry corresponding to the to-be-migrated data, and avoid a case in which the computer system cannot accurately determine a storage location of internal memory reclaiming data due to not updating in time.

FIG. 11 is a flowchart of an internal memory reclaiming method according to some embodiments, and the method is performed by a computer system. The method further includes the following operations.

Operation 420: In a case that the storage occupancy of the upper-level SWAP device reaches the water mark threshold, and the upper-level SWAP device has at least two lower-level SWAP devices, select a destination lower-level SWAP device for this migration from the at least two lower-level SWAP devices.

The water mark threshold refers to a usage threshold of the free space in the upper-level SWAP device, and the usage threshold is used for indicating that the remaining free space in the upper-level SWAP device is insufficient. When the storage occupancy of the upper-level SWAP device is less than or equal to the water mark threshold, it reflects that the remaining free space in the upper-level SWAP device is sufficient, and internal memory reclaiming data may be continuously swapped out to the upper-level SWAP device; and when the storage occupancy of the upper-level SWAP device is greater than the water mark threshold, it reflects that the remaining free space in the upper-level SWAP device is insufficient, and there is a possibility that internal memory reclaiming data cannot be continuously swapped out to the upper-level SWAP device. The water mark threshold may be preset in the computer system, or may be adjusted in real time based on a running state of the computer system. For example, the water mark threshold may be set to 60% or 80% of the maximum storage space of the upper-level SWAP device.

In a case that the storage occupancy of the upper-level SWAP device reaches the water mark threshold, and the upper-level SWAP device has at least two lower-level SWAP devices, a destination lower-level SWAP device is selected for this migration from the at least two lower-level SWAP devices. The at least two lower-level SWAP devices indicates that a priority of a use order in the computer system is lower than that of the upper-level SWAP device. Among at least two lower-level SWAP devices, a SWAP device with a higher priority ranks high in the use order in the computer system, and a SWAP device with a lower priority ranks low in the use order in the computer system.

In some embodiments, a lower-level SWAP device with a largest free storage capacity among the at least two lower-level SWAP devices is selected as the destination lower-level SWAP device for this migration. The free storage capacity refers to remaining free space used by the SWAP device to store or swap out internal memory data.

In some embodiments, a lower-level SWAP device with a highest priority among the at least two lower-level SWAP devices is selected as the destination lower-level SWAP device for this migration.

In some embodiments, a lower-level SWAP device with a lowest priority among the at least two lower-level SWAP devices is selected as the destination lower-level SWAP device for this migration.

In conclusion, according to some embodiments, in a case that the upper-level SWAP device has at least two lower-level SWAP devices, the destination lower-level SWAP device is selected for this migration from the at least two lower-level SWAP devices, to select a corresponding migration manner or combination, thereby releasing the storage space in the upper-level SWAP device and avoiding performance degradation of the computer system due to unbalanced use of the plurality of levels of SWAP devices.

Some embodiments provides an internal memory reclaiming method in which internal memory use popularity can be automatically evaluated based on characteristics of a SWAP device, and a plurality of levels of internal memory SWAP devices can be balanced in use, to improve available internal memory of the computer system while giving consideration to the performance. In the method, a high-performance SWAP device may be fully used, while dynamic balance of a utilization rate of different levels of SWAP devices may be maintained. This avoids performance degradation caused by an unbalanced utilization rate of devices, any quantity and level of SWAP devices may be adaptive, and there is no extra overhead when internal memory data is swapped from a SWAP device into physical internal memory.

The following is a general deployment example in which a ZRAM device is used as the most advanced SWAP device. In an internal memory reclaiming policy, it is to be ensured as much as possible that the ZRAM device is used preferentially, to ensure performance of swap-out and swap-in. After a long-term operation of the computer system, the ZRAM device is usually occupied by a large quantity of cold pages (internal memory data that has not been used for a long time) and cannot be fully used, resulting in hot pages (internal memory data that is used relatively frequently) being squeezed into a lower-level SWAP device. In addition, the ZRAM device has resident internal memory, which leads to internal memory cannot be completely released.

Three levels of SWAP devices: ZRAM, NVME, and HDD are used as an example. The ZRAM device has the best performance and is a device with the highest priority, followed by the NVME device, and the HDD device. In a case that the internal memory reclaiming method proposed in this application is not used, a large quantity of cold pages may be soon accumulated in a SWAP device with the highest priority.

In some embodiments, a water mark threshold is set for each SWAP device, and when a usage amount in the SWAP device exceeds the water mark threshold, the coldest page is automatically brushed to a slower and cheaper SWAP device. The water mark threshold refers to a usage threshold of the free space in the upper-level SWAP device, and the usage threshold is used for indicating that the remaining free space in the upper-level SWAP device is insufficient. When the storage occupancy of the upper-level SWAP device is less than or equal to the water mark threshold, it reflects that the remaining free space in the upper-level SWAP device is sufficient, and internal memory reclaiming data may be continuously swapped out to the upper-level SWAP device; and when the storage occupancy of the upper-level SWAP device is greater than the water mark threshold, it reflects that the remaining free space in the upper-level SWAP device is insufficient, and there is a possibility that internal memory reclaiming data cannot be continuously swapped out to the upper-level SWAP device. The water mark threshold may be preset in the computer system, or may be adjusted in real time based on a running state of the computer system. For example, the water mark threshold may be set to 60% or 80% of the maximum storage space of the upper-level SWAP device, and for example, may be adjusted based on a global pressure stall information (PSI) value of the computer system. When the global PSI value is small, it indicates that a delay of resource scheduling of the computer system is small in this case, and the water mark threshold is lowered to reclaim more internal memory in time. When the global PSI value is large, it indicates that the delay of resource scheduling of the computer system is large in this case, and the water mark threshold is raised to avoid affecting normal operation of the computer system.

The internal memory reclaiming method proposed in some embodiments of this application is used for releasing internal memory reclaiming data in a high-priority SWAP device, and the method includes: migrating the coldest page in the ZRAM device to the NVME device, and further migrating the coldest page in the NVME device to the HDD device. In this way, space in the ZRAM device with the highest priority is released, so that a hot page may preferentially use the ZRAM device, which can not only ensure running performance of the computer system, but also further reduce internal memory pressure of the computer system.

In the internal memory reclaiming method proposed in this application, an existing SWAP device swap-out policy does not need to be modified, and balance is achieved through a separate set of processes, which is low in intrusiveness and ensures simplicity and maintainability of logic.

The internal memory reclaiming method proposed in this application may be compatible with a plurality of levels of SWAP devices, does not need to be changed for SWAP devices with different rates and different access methods, and may automatically adapt to all types of SWAP devices after meeting engineering design requirements.

The internal memory reclaiming method proposed in this application needs to realize cold and hot statistics of an internal memory page swapped out from the SWAP device. Virtual internal memory technology is the basis of internal memory management. Physical internal memory seen in each process is mapped by a layer of page table, and each page table entry is a PTE pointing to a physical address. During swap-out, a SWAP device is selected, and a SWAP entry is allocated. The SWAP entry is written into a page table in which an original PTE is located, and an internal memory page of physical internal memory that is originally pointed to is released. The SWAP entry records an identifier, an offset, and other information of a SWAP device in which the internal memory page is located. When the process accesses the SWAP entry, a page error may occur. By capturing the page error, internal memory data is swapped from the SWAP device into the physical internal memory, and the SWAP entry on the SWAP device is released.

The internal memory reclaiming method proposed in this application maintains an LRU linked list for each SWAP device. When an internal memory page is swapped out to a SWAP device, a SWAP entry allocated for the internal memory page is synchronously recorded in the LRU linked list. Because characteristics of the SWAP device is to be swapped in through a page error, and a SWAP entry may be allocated and released, so LRU linked list processing is needed. Therefore, the method may highly ensure accuracy of an LRU linked list corresponding to the SWAP device.

Based on the internal memory page of the physical internal memory that has been swapped out, the internal memory reclaiming method provided in includes: finding out a cold page based on an LRU linked list maintained by each SWAP device, where an internal memory page that has not been used for the longest time is the coldest page. Determining a migrated target SWAP device. The SWAP device natively supports a priority, and a priority may be specified when a SWAP device is configured, or by default, a first mounted device has the highest priority. After usage of a relatively high-performance and high-priority SWAP device reaches a water mark threshold, a first relatively idle SWAP device is found out based on the priority. In a newly selected SWAP device, a new SWAP entry is directly allocated, and corresponding content in an old SWAP entry is completely copied, so that the newly selected SWAP device has a complete copy of the content of the old SWAP entry. Modifying the page table and enabling a new page table to point to the new SWAP entry. After the migration, a PTE in an original page table still points to a SWAP entry in an old SWAP device, so the page table needs to be modified to point to a SWAP entry in a new SWAP device. The internal memory reclaiming method provided in uses an asynchronous process for migration in a whole process, and the process directly changes the page table entry. When the page error occurs again and internal memory data needs to be swapped in, a corresponding migrated SWAP device is directly read.

In the internal memory reclaiming method provided in, swapped-out internal memory page popularity is managed in levels by maintaining a separate LRU linked list of each SWAP device, and a plurality of levels of SWAP devices are automatically balanced through migration of cold pages, achieving universality, performance, and accuracy in design. In a computer system using a plurality of levels of SWAP devices, SWAP devices with different priorities may be fully utilized, thereby reducing internal memory pressure in the computer system and ensuring running performance.

Figures 12, 13:
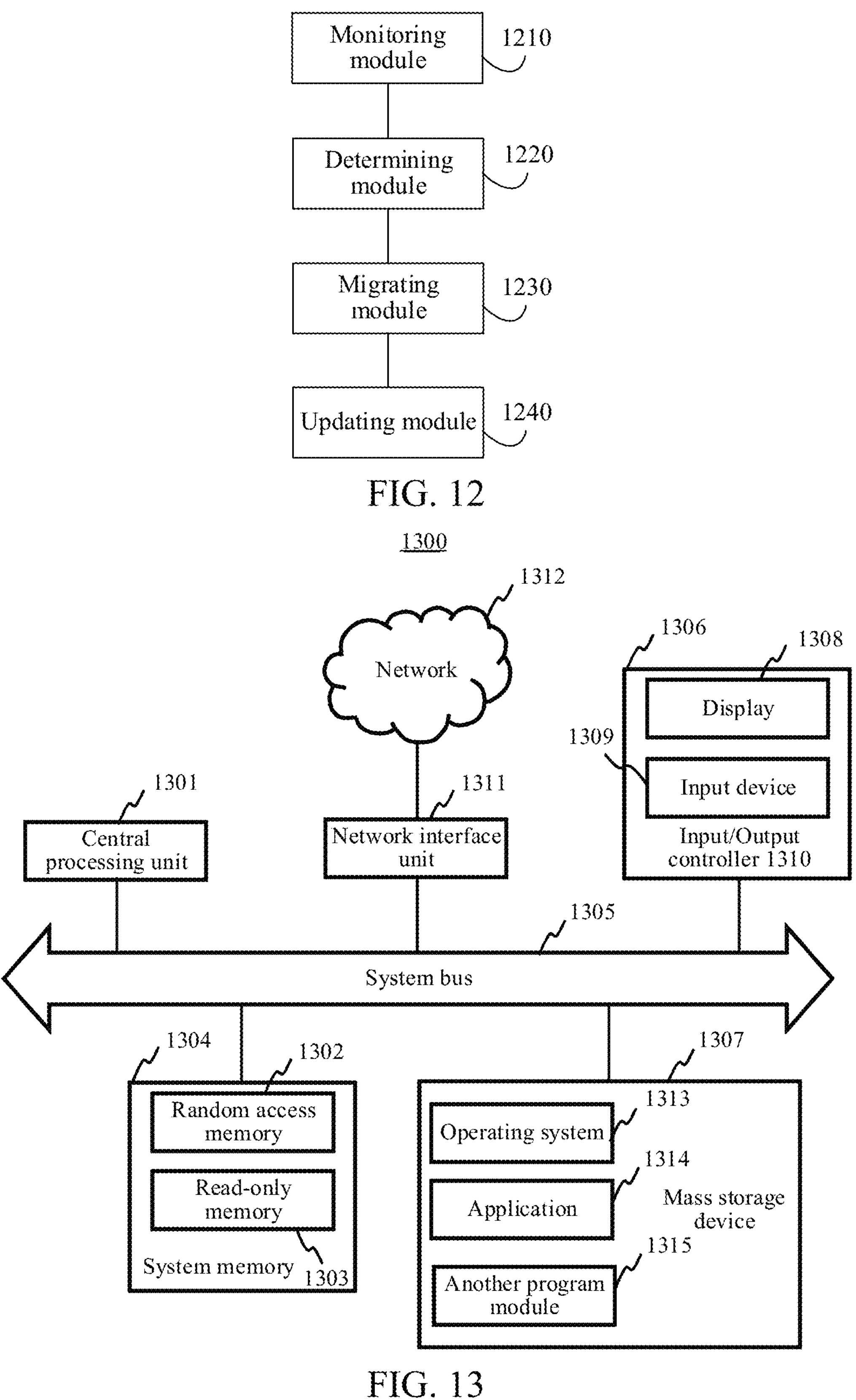
FIG. 12 is a block diagram of an internal memory reclaiming apparatus according to some embodiments.
FIG. 13 is a block diagram of a computer device according to some embodiments.

FIG. 12 is a block diagram of an internal memory reclaiming apparatus according to some embodiments. The apparatus includes at least two levels of SWAP devices, and the apparatus includes: a monitoring module 1210, configured to monitor storage occupancy of the at least two levels of SWAP devices, the at least two levels of SWAP devices including an upper-level SWAP device and a lower-level SWAP device; a determining module 1220, configured to determine, in a case that storage occupancy of the upper-level SWAP device reaches a water mark threshold, least recently used to-be-migrated data stored in the upper-level SWAP device; and a migrating module 1230, configured to migrate the to-be-migrated data from the upper-level SWAP device to the lower-level SWAP device.

The determining module 1220 is further configured to determine a target storage location that is free in the lower-level SWAP device.

The migrating module 1230 is further configured to migrate the to-be-migrated data from the upper-level SWAP device to the target storage location in the lower-level SWAP device. In some embodiments, the apparatus further includes: an updating module 1240.

The updating module 1240 is configured to update an LRU linked list of the lower-level SWAP device based on the target storage location.

The LRU linked list is used for maintaining an order in which different pieces of internal memory reclaiming data are reclaimed to the lower-level SWAP device.

For example, any SWAP device includes an LRU linked list, and the LRU linked list is used for maintaining an order in which different pieces of internal memory reclaiming data are reclaimed to the SWAP device. Generally, the order is from least recently used internal memory reclaiming data to most recently used internal memory reclaiming data sequentially.

The updating module 1240 is further configured to: when the internal memory reclaiming data is migrated from the upper-level SWAP device to the lower-level SWAP device, correspondingly modify an LRU linked list corresponding to the upper-level SWAP device and an LRU linked list corresponding to the lower-level SWAP device.

The updating module 1240 is further configured to remove a SWAP entry corresponding to to-be-migrated data in the LRU linked list of the upper-level SWAP device.

The updating module 1240 is further configured to insert a SWAP entry corresponding to to-be-migrated data into the LRU linked list of the lower-level SWAP device.

The updating module 1240 is further configured to allocate a lower-level SWAP entry pointing to the target storage location for the to-be-migrated data.

For example, the SWAP entry is used for recording storage location information of the internal memory reclaiming data. The storage location information includes an identifier of a SWAP device in which the internal memory reclaiming data is located, an offset of the internal memory reclaiming data in the SWAP device, and other information.

In some embodiments, the updating module 1240 is further configured to: when the internal memory reclaiming data is swapped out to the SWAP device, correspondingly allocate a SWAP entry and write the SWAP entry into a page table in which a PTE corresponding to the internal memory reclaiming data in physical internal memory is located.

The updating module 1240 is further configured to update the LRU linked list of the lower-level SWAP device based on the lower-level SWAP entry.

The LRU linked list sequentially stores lower-level SWAP entries of different pieces of internal memory reclaiming data based on a storage time.

The at least two levels of SWAP devices correspond to respective LRU linked lists, and the LRU linked lists are used for maintaining an order in which different pieces of internal memory reclaiming data are reclaimed to a current SWAP device.

For example, any SWAP device includes an LRU linked list, and the LRU linked list is used for maintaining an order in which different pieces of internal memory reclaiming data are reclaimed to the SWAP device. Generally, the order is from least recently used internal memory reclaiming data to most recently used internal memory reclaiming data sequentially, and the LRU linked list sequentially stores lower-level SWAP entries of different pieces of internal memory reclaiming data based on a storage time.

The determining module 1220 is further configured to: in a case that the storage occupancy of the upper-level SWAP device reaches the water mark threshold, determine, based on an LRU linked list corresponding to the upper-level SWAP device, the least recently used to-be-migrated data stored in the upper-level SWAP device.

The water mark threshold refers to a usage threshold of the free space in the upper-level SWAP device, and the usage threshold is used for indicating that the remaining free space in the upper-level SWAP device is insufficient. When the storage occupancy of the upper-level SWAP device is less than or equal to the water mark threshold, it reflects that the remaining free space in the upper-level SWAP device is sufficient, and internal memory reclaiming data may be continuously swapped out to the upper-level SWAP device; and when the storage occupancy of the upper-level SWAP device is greater than the water mark threshold, it reflects that the remaining free space in the upper-level SWAP device is insufficient, and there is a possibility that internal memory reclaiming data cannot be continuously swapped out to the upper-level SWAP device. The water mark threshold may be preset in the computer system, or may be adjusted in real time based on a running state of the computer system. For example, the water mark threshold may be set to 60% or 80% of the maximum storage space of the upper-level SWAP device. The updating module 1240 is further configured to replace, in an internal memory mapping table, an upper-level SWAP entry in a page table entry corresponding to the to-be-migrated data with a lower-level SWAP entry.

The page table entry is used for storing pointing information of a storage location of the to-be-migrated data in physical internal memory, the upper-level SWAP entry is pointing information of a storage location of the to-be-migrated data in the upper-level SWAP device, and the lower-level SWAP entry is pointing information of a storage location of the to-be-migrated data in the lower-level SWAP device.

For example, in the computer system, physical internal memory corresponds to an internal memory mapping table, the internal memory mapping table includes a PTE corresponding to internal memory data, and the PTE is used for storing or recording a location of corresponding internal memory data in the physical internal memory.

In some embodiments, the updating module 1240 is further configured to: in a case that the corresponding internal memory data is swapped out from the physical internal memory to the SWAP device, reallocate a SWAP entry corresponding to internal memory reclaiming data that is obtained through reclaiming.

The SWAP entry is used for recording storage location information of the internal memory reclaiming data. The storage location information includes an identifier of a SWAP device in which the internal memory reclaiming data is located, an offset of the internal memory reclaiming data in the SWAP device, and other information. In this case, the computer system writes the SWAP entry into a location of a PTE corresponding to internal memory data before being swapped out from the physical internal memory. When the computer system accesses the SWAP entry, a page error may occur. By capturing information of the page error, the computer system swaps the internal memory data into the physical internal memory, and releases the SWAP entry on the SWAP device.

In some embodiments, the updating module 1240 is further configured to: when least recently used to-be-migrated data stored in an upper-level SWAP device is migrated from the upper-level SWAP device to a target storage location in a lower-level SWAP device, update an upper-level SWAP entry corresponding to the to-be-migrated data to a new corresponding lower-level SWAP entry. The migrating module 1230 is further configured to: in a case that the storage occupancy of the upper-level SWAP device reaches the water mark threshold, and the upper-level SWAP device has at least two lower-level SWAP devices, select a destination lower-level SWAP device for this migration from the at least two lower-level SWAP devices.

For example, the water mark threshold refers to a usage threshold of the free space in the upper-level SWAP device, and the usage threshold is used for indicating that the remaining free space in the upper-level SWAP device is insufficient. When the storage occupancy of the upper-level SWAP device is less than or equal to the water mark threshold, it reflects that the remaining free space in the upper-level SWAP device is sufficient, and internal memory reclaiming data may be continuously swapped out to the upper-level SWAP device; and when the storage occupancy of the upper-level SWAP device is greater than the water mark threshold, it reflects that the remaining free space in the upper-level SWAP device is insufficient, and there is a possibility that internal memory reclaiming data cannot be continuously swapped out to the upper-level SWAP device. The water mark threshold may be preset in the computer system, or may be adjusted in real time based on a running state of the computer system. For example, the water mark threshold may be set to 60% or 80% of the maximum storage space of the upper-level SWAP device.

The at least two lower-level SWAP devices indicates that a priority of a use order in the computer system is lower than that of the upper-level SWAP device. Among at least two lower-level SWAP devices, a SWAP device with a higher priority ranks high in the use order in the computer system, and a SWAP device with a lower priority ranks low in the use order in the computer system.

The migrating module 1230 is further configured to select a lower-level SWAP device with a largest free storage capacity among the at least two lower-level SWAP devices as the destination lower-level SWAP device for this migration.

The migrating module 1230 is further configured to select a lower-level SWAP device with a highest priority among the at least two lower-level SWAP devices as the destination lower-level SWAP device for this migration.

The migrating module 1230 is further configured to select a lower-level SWAP device with a lowest priority among the at least two lower-level SWAP devices as the destination lower-level SWAP device for this migration.

FIG. 13 is a schematic diagram of a structure of a computer device according to some embodiments. For example, the computer device 1300 includes a central processing unit (CPU) 1301, a system memory 1304 including a random access memory (RAM) 1302 and a read-only memory (ROM) 1303, and a system bus 1305 connecting the system memory 1304 and the CPU 1301. The computer device 1300 further includes a basic input/output (I/O) system 1306 assisting in transmitting information between components in the computer, and a mass storage device 1307 configured to store an operating system 1313, an application 1314, and another program module 1315.

The basic I/O system 1306 includes a display 1308 configured to display information and an input device 1309 such as a mouse or a keyboard that is used for inputting information by a user. The display 1308 and the input device 1309 are both connected to the CPU 1301 by using an input/output controller 1310 connected to the system bus 1305. The basic I/O system 1306 may further include the input/output controller 1310 to be configured to receive and process inputs from a plurality of other devices such as a keyboard, a mouse, and an electronic stylus. Similarly, the input/output controller 1310 further provides output to a display screen, a printer, or other types of output devices.

The mass storage device 1307 is connected to the CPU 1301 by using a mass storage controller (not shown) connected to the system bus 1305. The mass storage device 1307 and an associated computer-readable medium provide non-volatile storage for the computer device 1300. In other words, the mass storage device 1307 may include a computer-readable medium (not shown) such as a hard disk or a compact disc read-only memory (CD-ROM) drive.

The computer-readable medium may include a computer storage medium and a communication medium. The computer storage medium includes volatile and non-volatile media, and removable and non-removable media implemented by using any method or technology used for storing information such as computer-readable instructions, data structures, program modules, or other data. The computer storage medium includes a RAM, a ROM, an erasable programmable read-only memory (EPROM), an electrically erasable programmable read-only memory (EEPROM), a flash memory or another solid-state memory technology, a CD-ROM, a digital versatile disc (DVD) or another optical memory, a tape cartridge, a magnetic cassette, a magnetic disk memory, or another magnetic storage device. Certainly, a person skilled in the art may learn that the computer storage medium is not limited to the foregoing several types. The foregoing system memory 1304 and mass storage device 1307 may be collectively referred to as a memory.

According to some embodiments, the computer device 1300 may further be connected, through a network such as the Internet, to a remote computer on the network and run. That is, the computer device 1300 may be connected to a network 1312 by using a network interface unit 1311 connected to the system bus 1305, or may be connected to another type of network or a remote computer system (not shown) by using a network interface unit 1311.

Some embodiments further provides a computer-readable storage medium. The computer-readable storage medium has at least one program stored therein, and the at least one program is loaded and executed by a processor to implement the internal memory reclaiming method provided in.

Some embodiments further provides a computer program product. The computer program product includes at least one program, and the at least one program is stored in a readable storage medium. A processor of a communication device reads signaling from the readable storage medium, and the processor executes the signaling to enable the communication device to perform and implement the internal memory reclaiming method provided in.

What is claimed is:

1. An internal memory reclaiming method, performed by a computer system that includes at least two levels of SWAP devices, the method comprising:

monitoring storage occupancy of the at least two levels of SWAP devices, the at least two levels of SWAP devices comprising an upper-level SWAP device and a lower-level SWAP device;

determining, in a case that storage occupancy of the upper-level SWAP device reaches a water mark threshold, least recently used to-be-migrated data stored in the upper-level SWAP device; and migrating the to-be-migrated data from the upper-level SWAP device to the lower-level SWAP device.

2. The method according to claim 1, wherein the migrating the to-be-migrated data from the upper-level SWAP device to the lower-level SWAP device comprises:

determining a free target storage location in the lower-level SWAP device;

migrating the to-be-migrated data from the upper-level SWAP device to the target storage location; and updating a least recently used (LRU) linked list of the lower-level SWAP device based on the target storage location, wherein the LRU linked list maintains an order for reclaiming internal memory data to the lower-level SWAP device.

3. The method according to claim 2, wherein the updating a least recently used (LRU) linked list of the lower-level SWAP device based on the target storage location comprises:

allocating a lower-level SWAP entry that points to the target storage location for the to-be-migrated data; and updating the LRU linked list of the lower-level SWAP device based on the lower-level SWAP entry, wherein the LRU linked list sequentially stores lower-level SWAP entries of internal memory reclaiming data based on a storage time.

4. The method according to claim 1, wherein the at least two levels of SWAP devices correspond to respective LRU linked lists, and the LRU linked lists maintain an order for reclaiming internal memory data to a current SWAP device; and determining, in a case that the storage occupancy of the upper-level SWAP device reaches a water mark threshold, to-be-migrated data stored in the upper-level SWAP device comprises:

in a case that the storage occupancy of the upper-level SWAP device reaches the water mark threshold, and an LRU linked list corresponding to the upper-level SWAP device, determining the least recently used to-be-migrated data stored in the upper-level SWAP device.

5. The method according to claim 1, wherein the method further comprises:

replacing, in an internal memory mapping table, an upper-level SWAP entry in a page table entry corresponding to the to-be-migrated data with a lower-level SWAP entry, wherein the page table entry stores pointing information of a storage location of the to-be-migrated data in physical internal memory, the upper-level SWAP entry points information of a storage location of the to-be-migrated data in the upper-level SWAP device, and the lower-level SWAP entry points information of a storage location of the to-be-migrated data in the lower-level SWAP device.

6. The method according to claim 1, further comprises:

in a case that the storage occupancy of the upper-level SWAP device reaches the water mark threshold, and the upper-level SWAP device has at least two lower-level SWAP devices, selecting a destination lower-level SWAP device from the at least two lower-level SWAP devices.

7. The method according to claim 6, wherein the selecting a destination lower-level SWAP device from the at least two lower-level SWAP devices comprises:

selecting a lower-level SWAP device with a largest free storage capacity among the at least two lower-level SWAP devices as the destination lower-level SWAP device;

or selecting a lower-level SWAP device with a highest priority among the at least two lower-level SWAP devices as the destination lower-level SWAP device;

or selecting a lower-level SWAP device with a lowest priority among the at least two lower-level SWAP devices as the destination lower-level SWAP device.

8. The method according to claim 1, wherein the water mark threshold is adjusted based on a global pressure stall information (PSI) value of the computer system, wherein the water mark threshold is lowered when the global PSI value decreases; or raised when the global PSI value increases.

9. The method according to claim 1, further comprises:

obtaining a mapping comparison table between the global PSI value and the water mark threshold; and adjusting the water mark threshold based on a correspondence between the global PSI value and the water mark threshold in the mapping comparison table.

10. An internal memory reclaiming apparatus, comprising:

at least one memory configured to store program code; and at least one processor configured to read the program code and operate as instructed by the program code, the program code comprising:

monitoring code configured to cause at least one of the at least one processor to monitor storage occupancy of the at least two levels of SWAP devices, wherein the at least two levels of SWAP devices comprise an upper-level SWAP device and a lower-level SWAP device;

determining code configured to cause at least one of the at least one processor to determine, in a case that storage occupancy of the upper-level SWAP device reaches a water mark threshold, least recently used to-be-migrated data stored in the upper-level SWAP device; and migrating code configured to cause at least one of the at least one processor to migrate the to-be-migrated data from the upper-level SWAP device to the lower-level SWAP device.

11. The apparatus according to claim 10, wherein the determining code is further configured to cause at least one of the at least one processor to determine a target storage location that is free in the lower-level SWAP device;

the migrating code is further configured to cause at least one of the at least one processor to migrate the to-be-migrated data from the upper-level SWAP device to the target storage location in the lower-level SWAP device; and the apparatus further comprises:

updating code configured to cause at least one of the at least one processor to update an LRU linked list of the lower-level SWAP device based on the target storage location, wherein the LRU linked list maintains an order for reclaiming internal memory data to the lower-level SWAP device.

12. The apparatus according to claim 11, wherein the updating codeis further configured to cause at least one of the at least one processor to allocate a lower-level SWAP entry pointing to the target storage location for the to-be-migrated data, and update the LRU linked list of the lower-level SWAP device based on the lower-level SWAP entry, wherein the LRU linked list sequentially stores lower-level SWAP entries of different pieces of internal memory reclaiming data based on a storage time.

13. The apparatus according to claim 10, wherein the at least two levels of SWAP devices correspond to respective LRU linked lists, and the LRU linked lists maintain an order in which different pieces of internal memory reclaiming data are reclaimed to a current SWAP device;

wherein the determining code is further configured to cause at least one of the at least one processor to in a case that the storage occupancy of the upper-level SWAP device reaches the water mark threshold, determine, based on an LRU linked list corresponding to the upper-level SWAP device, the least recently used to-be-migrated data stored in the upper-level SWAP device.

14. The apparatus according to claim 10, wherein the updating code is further configured to cause at least one of the at least one processor to replace, in an internal memory mapping table, an upper-level SWAP entry in a page table entry corresponding to the to-be-migrated data with a lower-level SWAP entry, wherein the page table entry stores pointing information of a storage location of the to-be-migrated data in physical internal memory, the upper-level SWAP entry points information of a storage location of the to-be-migrated data in the upper-level SWAP device, and the lower-level SWAP entry points information of a storage location of the to-be-migrated data in the lower-level SWAP device.

15. The apparatus according to claim 10, wherein the migrating code is further configured to cause at least one of the at least one processor to, in a case that the storage occupancy of the upper-level SWAP device reaches the water mark threshold, and the upper-level SWAP device has at least two lower-level SWAP devices, select a destination lower-level SWAP device for this migration from the at least two lower-level SWAP devices.

16. The apparatus according to claim 15, wherein the migrating code is further configured to cause at least one of the at least one processor to: select a lower-level SWAP device with a largest free storage capacity among the at least two lower-level SWAP devices as the destination lower-level SWAP device; or select a lower-level SWAP device with a highest priority among the at least two lower-level SWAP devices as the destination lower-level SWAP device; or select a lower-level SWAP device with a lowest priority among the at least two lower-level SWAP devices as the destination lower-level SWAP device.

17. The apparatus according to claim 10, wherein the program code further comprises:

adjusting code configured to cause at least one of the at least one processor to adjust the water mark threshold based on a global pressure stall information (PSI) value of the computer system;

wherein the water mark threshold is lowered when the global PSI value decreases, or the water mark threshold is raised when the global PSI value increases.

18. The apparatus according to claim 10, wherein the program code further comprises:

mapping code configured to cause at least one of the at least one processor to obtain a mapping comparison table between the global PSI value and the water mark threshold; and where the threshold adjusting code is further configured to cause at least one of the at least one processor to adjust the water mark threshold based on a correspondence between the global PSI value and the water mark threshold in the mapping comparison table.

19. A non-transitory computer-readable storage medium, storing computer code which, when executed by at least one processor, causes the at least one processor to at least:

monitor storage occupancy of the at least two levels of SWAP devices, wherein the at least two levels of SWAP devices comprise an upper-level SWAP device and a lower-level SWAP device;

determine, when storage occupancy of the upper-level SWAP device reaches a water mark threshold, least recently used to-be-migrated data stored in the upper-level SWAP device; and migrate the to-be-migrated data from the upper-level SWAP device to the lower-level SWAP device.

* * * * *